United States Patent [19]

Bruno

[11] Patent Number: 5,542,631
[45] Date of Patent: Aug. 6, 1996

[54] ADJUSTABLE PIPE HANGER

[76] Inventor: James F. Bruno, 650 Greentree, Ada, Mich. 49301

[21] Appl. No.: 283,799

[22] Filed: Aug. 1, 1994

[51] Int. Cl.⁶ .................................... F16L 3/00
[52] U.S. Cl. ................ 248/58; 248/59; 248/62; 248/289.11; 248/304; 248/324
[58] Field of Search ................ 248/58, 59, 62, 248/290, 289.1, 296, 307, 327, 339, 340, 304, 324

[56] References Cited

U.S. PATENT DOCUMENTS

| | | | |
|---|---|---|---|
| 462,616 | 11/1891 | Birkett . | |
| 661,604 | 11/1900 | Grabler . | |
| 753,969 | 3/1904 | Fee | 248/59 |
| 958,052 | 5/1910 | Williams . | |
| 1,392,810 | 10/1921 | Zifferer | 248/59 |
| 1,477,621 | 10/1923 | Zifferer | 248/59 |
| 1,804,472 | 5/1931 | Leslie . | |
| 1,898,898 | 2/1933 | Rowley | 248/59 |
| 2,319,832 | 5/1943 | Trochum . | |
| 2,671,232 | 3/1954 | Brancel | 248/289.1 X |
| 3,136,515 | 6/1964 | Potruch . | |
| 3,141,643 | 7/1964 | Shrewsbury . | |
| 3,273,837 | 9/1966 | Willert et al. . | |
| 3,279,300 | 10/1966 | Larson . | |
| 3,423,057 | 1/1969 | Iverson | 248/296 |
| 3,523,668 | 8/1970 | Logsdon | 248/59 |
| 3,559,910 | 2/1971 | Babb . | |
| 4,042,198 | 8/1977 | Takeuchi . | |
| 4,174,087 | 11/1979 | Gaines | 248/339 |
| 4,254,930 | 3/1981 | Warren . | |
| 4,407,478 | 10/1983 | Hodges . | |
| 5,211,149 | 6/1894 | Boyd . | |
| 5,221,064 | 6/1993 | Hodges | 248/59 |

OTHER PUBLICATIONS

Unknown; Excerpt from 1991 Jones Manufacturing Co. catalogue; section on hangers; Jan. 15, 1991.
Unknown; Excerpt from 1977 Specialty Products Company catalogue; section on hangers; 1977.

Primary Examiner—Alvin C. Chin-Shue
Assistant Examiner—Derek J. Berger
Attorney, Agent, or Firm—Bullwinkel Partners, Ltd.

[57] ABSTRACT

An adjustable pipe hanger for suspending a pipe from a support structure at a desired angle includes a stem and a flexible hook attached to the stem. The stem has a prismatic cross section and at least one hole extending therethrough. The hook has a curved portion and a means for attaching the hook to the stem in slidable fashion. The stem and hook are provided with a means for locking the hook at a desired angle to the support structure. The stem may be removed from the hook and inverted in order to suspend pipe in a confined area.

13 Claims, 2 Drawing Sheets

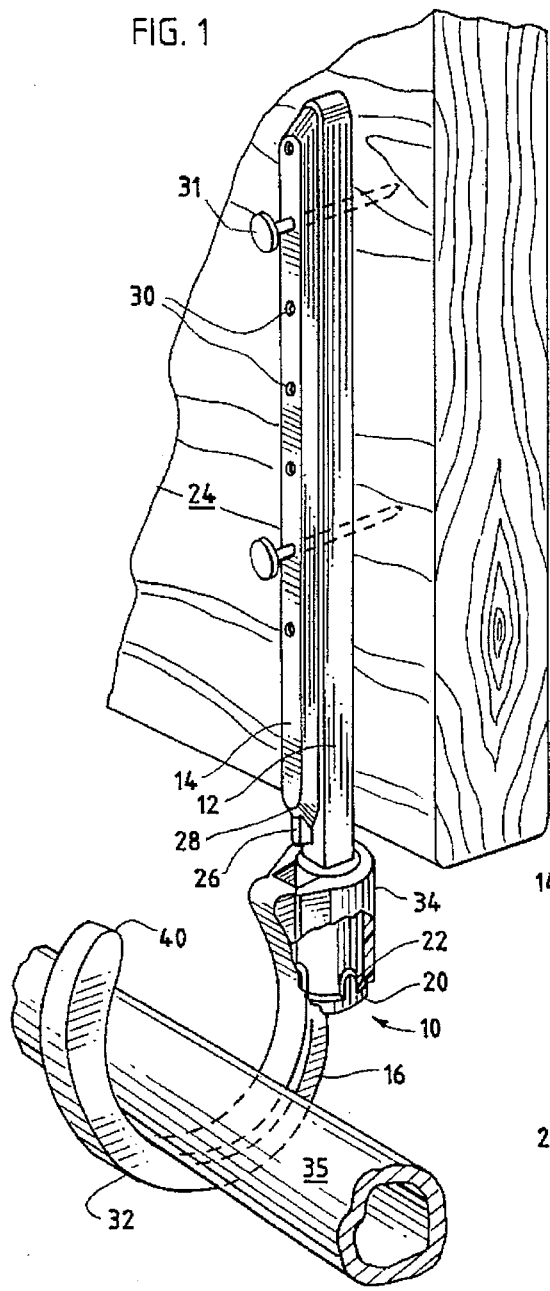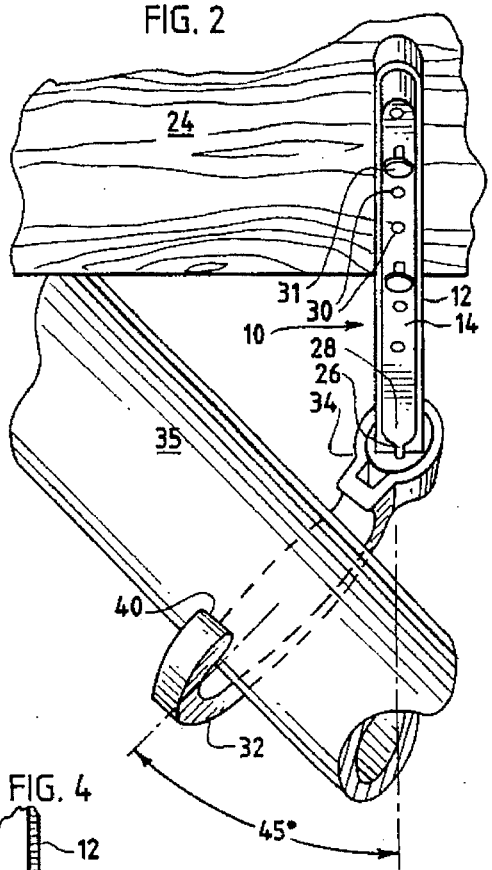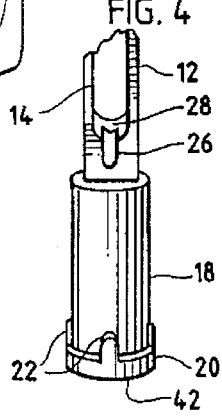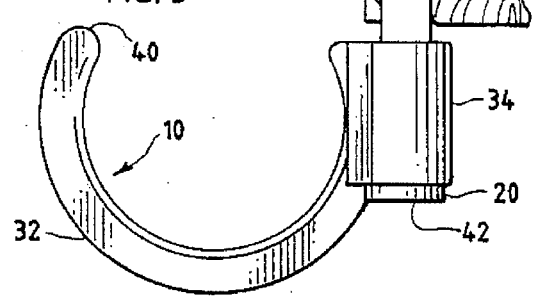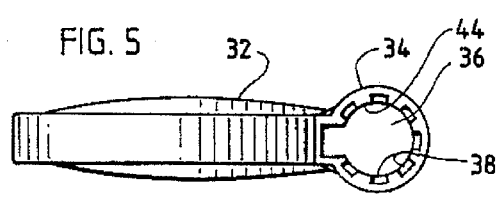

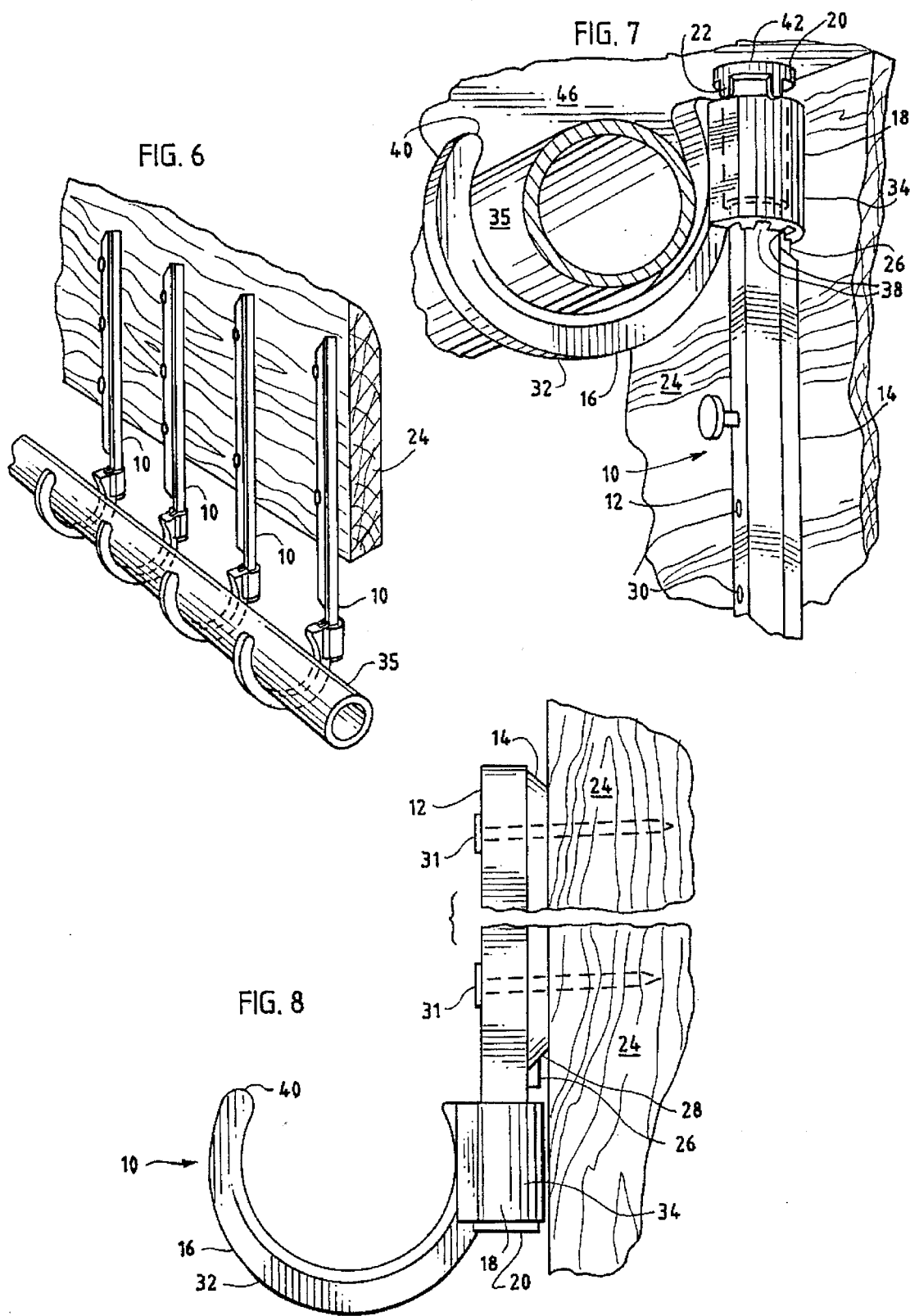

ADJUSTABLE PIPE HANGER

BACKGROUND

1. Field of the Invention

This patent relates to a pipe hanger for suspending pipes from a support structure. More particularly, this patent relates to a pipe hanger that can be adjusted to accommodate pipes suspended at varying angles with respect to a support structure.

2. Description of the Related Art

Pipe hangers are used to hang pipes from support structures such as joists or rafters. Typically, a plurality of pipe hangers are used in parallel to suspend a pipe. The pipe hangers are first secured to the joists by nails or other means and the pipe is then snapped into the hook portion of the pipe hangers.

Conventional pipe hangers, such as that disclosed in U.S. Pat. No. 4,407,478, comprise a stem and a hook or clamp portion attached in fixed relationship to the stem for accommodating the pipe. The stem has a prismatic, though typically square, cross section. Holes in the stem accommodate nails or other means of attachment. Where the cross section of the stem is a square, two sets of holes may extend through the stem in mutually perpendicular relationship to allow the hanger to be mounted on its front, rear, or lateral sides, thereby providing a limited amount of mounting flexibility. For example, pipe hangers constructed in this way can be used to hang pipes either parallel or perpendicular to the joists from which they are suspended.

However, such pipe hangers are still limited in the amount of mounting flexibility they provide. For example, the pipe hanger disclosed in U.S. Pat. No. 4,407,478 provides only three mounting orientations: front, rear, and lateral. Such pipe hangers cannot be used where, for example, pipe is to be hung at an angle of 45 degrees with respect to the joist. Thus, there remains a need for a pipe hanger that can provide more mounting flexibility.

In addition, conventional pipe hangers such as that disclosed in U.S. Pat. No. 4,407,478 cannot be easily used where the pipe is to be hung close to a ceiling, subflooring or other obstruction. The stems of conventional pipe hangers extend upward from the hook or clamp, preventing the hook or clamp from being placed close to the ceiling, subflooring or obstruction. Cutting the stem and making it shorter is awkward and time consuming. Thus, there exists a need for a single pipe hanger that can be used to hang pipe both away from and close to a ceiling, subflooring or obstruction.

SUMMARY OF THE INVENTION

The present invention is an adjustable pipe hanger for suspending a pipe from a support structure comprising an elongate stem for mounting to the support structure, a rib integral with and extending along part of one side of the stem, and a flexible hook that slides over the stem and rib and may be rotated about one end of the stem and locked at an angle with respect to the support structure, thereby allowing the pipe to be suspended at various angles with respect to the support structure.

The stem may be separated from the flexible hook, inverted and slid back through the hook. Thus, the pipe hanger may be installed with the lower end, i.e. the end with the stop means, pointing up, allowing for the hanging of pipe close to a ceiling, subflooring or other obstruction.

The hook comprises a curved portion and a means for attachment to the stem. The curved portion forms a saddle for accommodating the pipe. Preferably, the curved portion has a radius of curvature defining an arc from the attachment means to an end of the curved portion in excess of 180 degrees, and the end of the curved portion is spaced from the attachment means a distance less than the diameter of the pipe to be suspended so that the pipe may be snap-fit in the curved portion. The attachment means has a central bore configured to accommodate the stem and rib in sliding fashion.

The stem and rib have at least one hole, and preferably a plurality of holes, extending therethrough in a transverse direction for accommodating nails or other means of attachment to the support structure. The stem defines an axis and has at one end, hereinafter referred to as the lower end, a stop means upon which the hook rests when the pipe hanger is assembled in one configuration.

The pipe hanger can be assembled in one of two configurations. In one configuration, the stem is inserted through the attachment means such that the stop means points down, i.e. away from the subflooring. The hook rests on the stop means, and is held at a fixed angle to the support structure by a first locking means.

A second configuration may be used when a pipe is to be hung close to a ceiling, subflooring or other obstruction. In this second configuration, the stem is removed from the hook, inverted, and reinserted through the attachment means of the hook such that the end of the pipe hanger with the stop means (the lower end) is pointing up, i.e., toward the support structure. In this configuration, the hook rests on and is held at the desired angle by a second locking means extending from the rib.

It is an object of the present invention to provide an improved pipe hanger of the type described above providing increased flexibility in mounting pipes from support structures.

A further object is to provide an improved pipe hanger in which the hook portion may be set at various desires angles with respect to the support structure.

An additional object is to provide an improved pipe hanger that can be used to suspend pipe in close proximity to a ceiling, subflooring or other obstruction.

A still further object is to provide a rotatable pipe hanger which may be set flush against a support structure for easy nailing of the pipe hanger to the support structure.

Yet another object of the present invention is to provide a pipe hanger that reduces installation time and avoids time consuming measuring and adjusting.

Further and additional objects will appear from the description, accompanying drawings, and appended claims.

BRIEF DESCRIPTION OF THE DRAWINGS

FIG. 1 is a perspective view of a pipe hanger according to the present invention mounted to a support structure and suspending a pipe parallel to the support structure.

FIG. 2 is a perspective view of the pipe hanger of FIG. 1 mounted to a support structure and suspending a pipe at an angle of 45 degrees with respect to the support structure.

FIG. 3 is a side view of the pipe hanger of FIG. 1.

FIG. 4 is a front view of the lower end of the stem portion of the pipe hanger of FIG. 1, showing detents for engaging the hook.

FIG. 5 is a bottom view of the hook portion of the pipe hanger of FIG. 1, showing the notches which engage the stem detents.

FIG. 6 is a perspective view of a series of pipe hangers as shown in FIG. 1, suspending a pipe parallel to a support structure.

FIG. 7 is a perspective view of the pipe hanger of FIG. 1 mounted to a support structure and suspending a pipe parallel to the support structure, wherein the stem has been inverted to allow the pipe to be suspended close to a subflooring.

FIG. 8 is a side view of the pipe hanger of FIG. 1 in which the support structure extends below the hook, showing the pipe hanger and hook mounted flush against the support structure.

DETAILED DESCRIPTION OF THE INVENTION

Turning to the drawings, there is shown in FIG. 1 one embodiment of an adjustable pipe hanger 10 according to the present invention. The pipe hanger 10 comprises an elongate stem 12, a rib 14 extending along one side of the stem 12, and a flexible hook 16.

The stem 12 may vary in length, and may include graduated markings on one or more sides (not shown) to assist in suspending the hooks the proper distance from the bottom of the supports. The stem 12 has a prismatic, preferably rectangular, cross section for most of its length, and a smooth, substantially cylindrical cross section for a portion of its length, as shown in FIG. 4. Disposed at one end of the cylindrically-shaped portion 18 of the stem 12 is a stop means 20, preferably a flange, against which the hook 16 rests when the pipe hanger 10 is assembled in one of two possible configurations.

The pipe hanger 10 also comprises a first means for locking the hook 16 about the stem 12 at a desired angle when the hook 16 is resting on the stop means 20. Preferably, this first locking means is a series a equally spaced detents 22 extending upward from the stop means 20 and integral therewith, although as few as one detent may be used.

In the preferred embodiment, the rib 14 extends along part of one side of the stem 12 and is integral therewith. The rib 14 allows for a flush fit of the pipe hanger 10 against a support structure 24 when the hook 16 is level with the support structure 24 and oriented away from the rib 14, as best shown in FIG. 8.

The rib 14 has an integrally formed detent 26 extending from its lower end 28. As will be explained in detail below, this detent 26 is used to lock the hook 16 in place when pipe is to be hung in confined areas.

The stem 12 defines an axis along its length, and the stem 12 and rib 14 have at least one hole 30 extending therethrough in a direction transverse to the axis. In the preferred embodiment, a series of holes 30 are drilled through the stem 12 and rib 14 at distances of about one inch apart to accommodate nails 31 or other means of attaching the pipe hanger 10 to the joist or other structural element. In the embodiment shown in FIG. 1, the holes 30 extend in parallel through the stem 12 and rib 14.

The flexible hook 16 comprises a curved portion 32 and a means for attaching the hook 16 to the stem 12. Preferably, the attachment means is substantially cylindrical, as shown in FIGS. 1 and 5, but other shapes are contemplated. The attachment means 34 has a central bore 36 configured to accommodate the stem 12 and rib 14 in sliding fashion. Notches 38 at one end of the attachment means 34 engage, depending on the configuration, either the stem detents 22 or the rib detent 26, for locking the hook 16 at a desired angle with respect to the joist 24.

In the preferred embodiment, the curved portion 32 has a radius of curvature defining an arc from the attachment means 34 to an end 40 of the curved portion in excess of 180 degrees. The end 40 of the curved portion is spaced from the attachment means 34 a distance less than the diameter of the pipe 35 to be suspended so that the pipe 35 may be snap-fit in the curved portion 32. Thus, the curved portion 32 must be flexed outwardly when a pipe 35 is snapped into place. In practice, the pipe 35 may be snap-fit either before or after the pipe hanger 10 has been mounted to a support 24. The curved portion 32 may be configured to receive pipes of varying dimensions, including but not limited to the following nominal pipe sizes: ½ inch, ¾ inch, 1 inch, 1½ inches, 2 inches, 3 inches, and 4 inches.

The pipe hanger 10 may be used in one of two configurations. In applications where the pipe 35 is to be suspended away from the subflooring (e.g., FIGS. 1–3 and FIG. 6), the pipe hanger 10 is assembled such that the stem 12 is oriented with its lower end 42, that is, the end with the stop means 20, pointing away from the joist 24. In this configuration, the hook 16 rests on the stop means 20. The stem detents 22 engage the notches 38 of the attachment means 34 of the hook 16 after the hook 16 has been rotated about the stem axis to the desired angle.

In the preferred embodiment, the notches 38 are evenly spaced every 45 degrees about the inside wall 44 of the substantially cylindrical portion 34, such that the hook 16 can be locked in place at 45 degree increments. However, the notches 38 and detents 22 can be configured to provide additional flexibility in locking the hook 16. For example, the notches 38 can be spaced apart every 12.5 degrees, thus allowing the hook 16 to be locked in place every 12.5 degrees.

A second configuration may be used where the pipe is to be suspended close to a ceiling, subflooring or other obstruction. In this second configuration, the stem 12 is removed from the hook 16, inverted so that the stop means 20 now points up, or toward the subflooring 46 (FIG. 7), and reinserted through the central bore 36 of the hook attachment means 34. The hook 16 is then rotated about the cylindrically-shaped portion 18 of the stem 12 to the desired angle and locked at that angle by engaging the rib detent 26, which now points up. The hook 16 rests on the rib detent 26. The pipe hanger 10 may be nailed to the joist 24 and the pipe 35 snap-fit into the curved portion 32 of the hook 16.

In order to facilitate nailing the pipe hanger 10 to the joist 24 when the joist 24 extends to or below the level of the hook 16 (see FIGS. 7 and 8), it is desirable that the pipe hanger 10 lie flush against the joist 24. This is achieved in the present invention by sizing the attachment means 34 such that, when the curved portion 32 is oriented away from the rib 14, the attachment means 34 does not extend beyond the rib 14 (FIG. 8). The pipe hanger 10 will not lie flush if the attachment means 34 extends beyond the rib 14.

As shown in FIG. 6, a plurality of pipe hangers 10 can be used to suspend a pipe 35 from a support structure 24. In the example shown in FIG. 6, the pipe 35 is suspended parallel to a joist 24.

The pipe hanger 10 may be formed of a resilient plastic material, such as ABS or PVC, or other appropriate material.

The improved pipe hanger 10 is inexpensive to manufacture and easy to use. The pipe hanger 10 includes novel structural features, including the rib 14, means for locking the hook 16 at a variety of angles to a joist, and means for configuring the hanger when suspending pipe in confined areas.

Other modifications and alternative embodiments of the invention are contemplated which do not depart from the spirit and scope of the invention as defined by the foregoing teachings and appended claims. For example, it is contemplated that additional hooks may be mounted on a single stem at various heights to accommodate multiple pipes. Thus the foregoing description and drawings are merely illustrative and not intended to limit the scope of the invention as claimed.

I claim as my Invention:

1. An adjustable pipe hanger for suspending a pipe from a support structure comprising:

an elongate stem for mounting to the support structure and defining an axis, said stem having at least one hole extending therethrough in a transverse direction so that the stem can be nailed to the support surface;

stop means disposed at one end of the stem;

a flexible hook rotatable about a portion of the stem and comprising a curved portion adapted to receive the pipe and a means for attachment to the stem;

said attachment means having a central bore configured to accommodate the stem in sliding fashion; and means for locking the hook about the stem at the desired angle when the hook is resting on the stop means.

2. The adjustable pipe hanger of claim 1 in which said curved portion has a radius of curvature defining an arc from the attachment means to an end of the curved portion in excess of 180 degrees, and the end of said curved portion is spaced from the attachment means a distance less than the diameter of the curved portion such that a pipe, having a diameter of about the diameter of the curved portion, can be snap-fit in the curved portion.

3. An adjustable pipe hanger for suspending a pipe from a support structure comprising:

an elongate stem for mounting to the support structure;

a rib integral with and extending along part of one side of the stem, the stem and rib having corresponding first and second ends;

said stem defining an axis and having at its first end a stop means;

the stem and rib having at least one hole extending therethrough in a transverse direction;

a hook rotatable about a portion of the stem and comprising a curved portion adapted to receive a pipe and a means for attachment to the stem;

said attachment means having a central bore configured to accommodate the stem and rib in sliding fashion so that the stem may be separated from the hook, inverted, and then slid back through the central bore;

first means for locking the hook at a desired angle with respect to the stem when the hook is resting on the stop means; and second means for locking the hook at a desired angle with respect to the stem when the hook is resting on the first end of the rib.

4. The adjustable pipe hanger of claim 3 wherein the first locking means comprises at least one detent extending upwardly from the stop means, said at least one detent being engageable with notches disposed at one end of the attachment means.

5. The adjustable pipe hanger of claim 4 wherein the notches are evenly spaced every 45 degrees about a portion of an inside wall of the attachment means.

6. The adjustable pipe hanger of claim 4 wherein the notches are evenly spaced every 12.5 degrees about a portion of an inside wall of the attachment means.

7. The adjustable pipe hanger of claim 4 wherein the notches are symmetrically distributed about a portion of an inside wall of the attachment means.

8. The adjustable pipe hanger of claim 3 in which said curved portion has a radius of curvature defining an arc from the attachment means to an end of the curved portion in excess of 180 degrees, and the end of said curved portion is spaced from the attachment means a distance less than the diameter of the curved portion such that a pipe, having a diameter of about the diameter of the curved portion, can be snap-fit in the curved portion.

9. The adjustable pipe hanger of claim 3 wherein the hole or holes are configured to accommodate nails for securing the pipe hanger to the support structure.

10. The adjustable pipe hanger of claim 3 wherein the stem, rib, and hook are formed of a resilient plastic material.

11. The adjustable pipe hanger of claim 3 further comprising additional flexible hooks mounted at various heights along the stem.

12. An adjustable pipe hanger for suspending a pipe from a support structure comprising:

an elongate stem for mounting to the support structure;

a rib integral with and extending along part of one side of the stem, the stem and rib having corresponding first and second ends;

said stem defining an axis and having at its first end an integrally formed stop means and at least one detent extending therefrom;

said rib having an integrally formed detent extending from its first end;

the stem and rib having at least one hole extending therethrough in a transverse direction; and a flexible hook comprising a curved portion and an attachment portion;

said curved portion having a radius of curvature defining an arc from the substantially cylindrical portion to an end of the curved portion in excess of 180 degrees, the end of said curved portion being spaced from the substantially cylindrical portion a distance less than the diameter of the curved portion such that a pipe, having a diameter of about the diameter of the curved portion, can be snap-fit in the curved portion;

said attachment portion having a central bore configured to accommodate the stem and rib in sliding fashion and notches at one end to accommodate the at least one stop means detent and the rib detent, said attachment portion being of such dimensions that, when the curved portion is oriented away from the rib, the rib and attachment means may be flush fit against a support structure.

13. The adjustable pipe hanger of claim 12 wherein the stem and the hook are separable, such that when the stem is oriented with its lower end pointing down, the hook may be slid onto the stem so that the hook attachment portion engages the at least one detent extending from the stop means, and when the stem is oriented with its lower end pointing up, the hook may be inverted so that the hook attachment portion engages the rib detent.

* * * * *